WILLIAM P. RIPLEY.

Improvement in Reach-Coupling for Wagons.

No. 128,068. Patented June 18, 1872.

Witnesses:
P. C. Dieterich
W. A. Graham

Inventor:
W. P. Ripley
Per Mmm
Attorneys.

128,068

UNITED STATES PATENT OFFICE.

WILLIAM P. RIPLEY, OF FRIENDSHIP, TENNESSEE.

IMPROVEMENT IN REACH-COUPLINGS FOR WAGONS.

Specification forming part of Letters Patent No. 128,068, dated June 18, 1872.

Specification describing a new and useful Improvement in Reach-Coupling for Wagons, invented by WILLIAM P. RIPLEY, of Friendship, in the county of Dyer and State of Tennessee.

Figure 1:
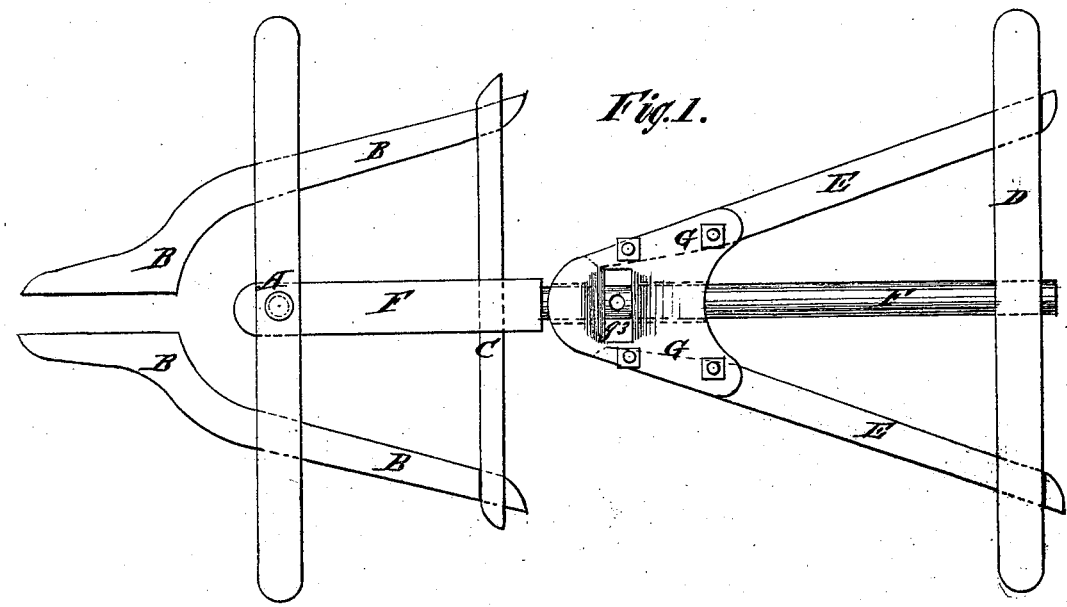
Figure 2:
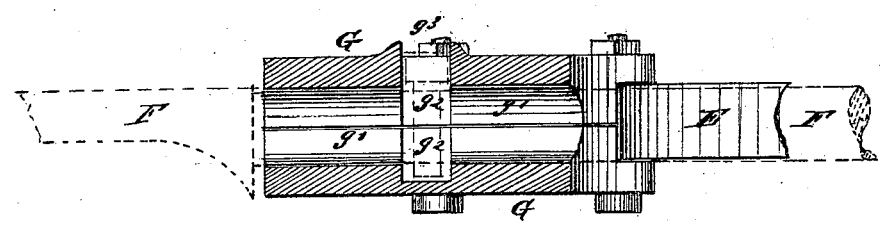

Figure 1 is a top view of the running-gearing of a wagon to which my improvement has been applied. Fig. 2 is a detail sectional view of the same.

Similar letters of reference indicate corresponding parts.

My invention has for its object to furnish an improved coupling for connecting the reach to the rear hounds, which shall be simple in construction and effective in operation, coupling the reach to the hounds in such a way that, while making the connection firm and secure, the reach may turn freely in the hounds, but cannot move longitudinally. This I accomplish by an arrangement of parts hereinafter described.

A represents the forward axle; B, the forward hounds; C, the sway-bar; D, the rear axle; E, the rear hounds; and F, the reach of a wagon-gearing. The forward part of the reach F is made flat, and is pivoted to the forward part of the wagon-gearing by the king-bolt in the ordinary manner. The rear part of the reach F is made round, and passes back between the rear hounds E and through the rear axle D. G are two cast-iron plates, so formed as to fit upon each other and upon the forward ends of the hounds E. In the inner side of each of the plates G is formed a semicircular groove, $g^1$, which grooves, when the plates G are secured to each other and to the forward ends of the hounds E, form a socket or round hole to receive the reach F. In the inner sides of the middle parts of the plates G is formed a transverse circular groove, $g^2$, to receive the ends of the pin that connects the reach to said plates. The coupling-pin is made without a head, and of a length greater than the diameter of the reach F, so that its ends may project upon both sides of the reach F to enter the groove $g^2$, and thus prevent any longitudinal movement of the reach, while allowing it to turn freely. In the upper plate G is formed a short transverse slot, $g^3$, to allow the coupling-pin to be put in and taken out freely, while preventing the pin from coming out accidentally.

I am well aware of the use of a reach the front part or section of which rotates in the stationary rear part; but my invention pertains to a new construction of plates for connecting the rear hounds and the rotating reach, made entire or in one piece; and I accordingly disclaim such arrangement.

Having thus described my invention, I claim as new and desire to secure by Letters Patent—

The plates G G, each provided with the recesses specified, so that when put together they form a central longitudinal opening, $g^1$, for the reach, a transverse groove, $g^2$, for locking-pin, and lateral sockets for the forward ends of the hounds E, all as shown and described.

WILLIAM PERRY RIPLEY.

Witnesses:
S. E. RICHARDSON,
J. C. PINNER.